United States Patent Office 3,708,423

Patented Jan. 2, 1973

3,708,423

ANNULAR CORE CONSISTING OF A FERROMAGNETIC FERRITE AND TO BE USED AS A MAGNETIC MEMORY ELEMENT AND METHOD OF MANUFACTURING SUCH A MAGNETIC CORE

Cornelis Jacobus Esveldt and Nicolaas Petrus Slijkerman, Emmasingel, Eindhoven, Netherlands, assignors to U.S. Philips Corporation, New York, N.Y.

No Drawing. Filed Jan. 5, 1971, Ser. No. 104,157
Claims priority, application Netherlands, Feb. 4, 1970, 7001539
Int. Cl. C04b 35/26
U.S. Cl. 252—62.61 5 Claims

ABSTRACT OF THE DISCLOSURE

The invention relates to magnet cores consisting of a ferromagnetic ferrite and having extremely small dimensions (so-called "14-mil-cores") and to the manufacture of such cores. On the one hand, memory elements consisting of copper manganese ferrite, and on the other hand memory elements consisting of lithium nickel ferrite were already known. However, 14-mil-cores having fully satisfying properties cannot be manufactured from either of the two ferrite types. The invention provides a way out from this difficulty by proposing to construct a memory core from a combination of the two above-mentioned types of ferrite. The memory elements according to the invention consisting of mixed ferrites of copper, manganese, lithium and nickel unite in themselves the favourable properties, but do not show the less favourable properties of the manganese ferrite and lithium nickel ferrite, respectively, as components for memory cores of the 14-mil-type.

The invention relates to an annular magnet core consisting of a ferromagnetic ferrite and suitable for use in magnetic memories, and to a method of manufacturing such a magnet core.

As is known, magnetic memories are nowadays universally used in electronic computers. In this connection it is endeavoured to have dimensions of the magnet cores which are as small as possible (see, for example, W. K. Westmijze, "Eigenschaften und Anwendungen von Magnetkernen in der Messwertverarbeitung," Elektrotechnische Zeitschrift-A, vol. 81, nr. 22, pp. 779–783, especially p. 781, Oct. 24, 1964, and Q. W. Simkins, "The State of the Art of Magnetic Memories," Journal of Applied Physics, Supplement to Volume 33, nr. 3, pp. 1020–1024, especially p. 1020, March 1962).

Annular magnet cores were already known which consisted of copper manganese ferrite having an outer diameter of at most 0.6 mm. and an inner diameter of at least half of the outer diameter, obtained by sintering the prefired product of a mixture of oxides of copper, iron and manganese, which oxides can individually be replaced fully or partly by an equivalent quantity of one or more other compounds of the metal in question which upon sintering can be converted into the relative oxide, in which mixture the relative quantities of copper (calculated on $CuO$), iron (calculated on $Fe_2O_3$) and manganese (calculated on $MnO$) are: 4–6 mol percent $CuO$, 38–44 mol percent $Fe_2O_3$, and 50–58 mol percent $MnO$.

Technically useful memory cores having an outside diameter under 0.4 mm., however, cannot be manufactured from such copper manganese ferrites; actually, for that purpose on the one hand the switching time, $t_s$, is relatively too large and on the other hand the maximum value of the undisturbed "one"-signal, $uV_1$, is relatively too small.

Likewise annular magnet cores were already known which consisted of lithium nickel ferrite and having an outer diameter of at most 0.6 mm. and an inner diameter which is at least half of the outer diameter, obtained by sintering the prefired product of a mixture of oxides of lithium, nickel and iron, which oxides can individually be fully or partly replaced by an equivalent quantity of one or more other compounds of the relative metal which upon sintering can be converted into the relative oxide, in which mixture the relative quantities of lithium (calculated on $Li_2O$), nickel (calculated on $NiO$), and iron (calculated on $Fe_2O_3$) are: 14–15 mol percent $Li_2O$, 5–7 mol percent $NiO$, and 78–81 mol percent $Fe_2O_3$.

True, it is possible indeed to manufacture from such lithium nickel ferrites memory cores having an outside diameter smaller than 0.4 mm. which are distinguished both by a comparatively low $t_s$ and by a comparatively high $uV_1$. These cores, however, have an electric resistance, R, measured across the core of approximately 50 k.ohm, i.e., an amount of only approximately 1% of that of the corresponding resistance of a core of the above-mentioned copper manganese ferrite. The expression "resistance measured across the core" (R) is to be understood to mean the resistance which is measured as follows. The memory core is laid flat on a flat copper plate. Then a second flat copper plate is laid on the core, which plate thus extends parallel to the first mentioned plate. The resistance of the electric circuit constituted by the first copper plate, the core, and the second copper plate is then measured. The share of the two copper plates in the total resistance of the circuit is negligibly small.

The said comparatively low electric resistance in practice means a great drawback. Actually, in the cores in question having very small dimensions, the insulation layers of the windings can easily be damaged and since in addition the mutual distances between adjacent cores in the matrix are very small, leakage currents *via* the cores may occur, which impedes a correct functioning of the matrix.

The invention provides a memory element consisting of an annular ferrite core having an outer diameter smaller than 0.4 mm. and an inner diameter which is at least equal to half of the outer diameter, which core shows neither the above-mentioned drawbacks of the copper manganese ferrite cores of the same dimensions, not the above-mentioned drawbacks of the lithium ferrite cores of the same dimensions. This memory core consists of a copper manganese lithium nickel ferrite, the cation content of which, expressed in mol percent of the oxides $CuO$, $MnO$, $NiO$ and $Fe_2O_3$, lies within the range defined by the following limits 0.5–3.0 mol percent $CuO$, 5.5–33.0 mol percent $MnO$, 5.8–13.1 mol percent $Li_2O$, 2.6–5.8 mol percent $NiO$, and 55.8–75.2 mol percent $Fe_2O_3$.

The invention also comprises a method of manufacturing a memory core of the above-mentioned type. According to this method, first a ferrite powder (or a mixture of ferrite powders) having a composition within the above-defined range, is prepared in known manner by grinding, mixing, prefiring and renewed grinding. This powder or mixture of powders is preferably mixed with a binder to form a paste and said paste is evenly coated in a layer of the desirable thickness on a supporting foil consisting of a synthetic resin suitable for the purpose, after which the layer is left to dry. The ferrite layer is then detached from the supporting foil. Rings of the desirable dimensions are punched out of the ferrite layer. The punched rings are finally sintered, after expelling the binder, by heating at approximately 300° C. However, the powder or the mixture of powders may also be processed with a binder to granules and said granules may be compressed to rings of the desirable dimensions which, after expelling the binder by heating at approximately 300° C., are sintered.

The sintering temperature in the method according to the present invention lies between 1125° C. and 1225° C., preferably between 1160° C. and 1180° C.

In order that the invention may readily carried into effect, a few examples thereof will now be described in greater detail.

EXAMPLE I

A finely divided mixture of 1.5 mol percent copper oxide, CuO, 16.5 mol percent manganese carbonate, $MnCO_3$, 10.2 mol percent lithium carbonate, $Li_2CO_3$, 4.4 mol percent nickel oxide, NiO, and 67.4 mol percent iron oxide, $Fe_2O_3$, was prefired by heating in air at 700° C. for 3 hours in a chamber furnace. The resulting prefired powder was processed with a binder to a ribbon of 100 microns thickness. Rings having an outer diameter of 435 microns and an inner diameter of 285 microns were punched from said ribbon.

The punched rings were conducted through a continuous conveyor-belt furnace. The furnace space is divided into two compartments which communicate with each other through a lock. In each of the two compartments an electric heating element is present. All this makes it possible to maintain in the furnace two different temperature zones in which, if desirable, two different gas atmospheres may be present. An approximately 3 cm. wide uninterrupted platinum belt on which the rings to be sintered are placed travels through the furnace (at controllable speed). In the present case, the first furnace zone traversed by the rings contains air at a temperature of 1170° C.; the second zone contains nitrogen at a temperature of 900° C. The rings travelled through the furnace, which was totally 130 cm. long, in two minutes, so at a rate of 65 cm./minute. Then they were cooled in air. The resulting ferrite rings had an outer diameter of 350 microns, an inside diameter of 230 microns and a height of 75 microns.

Pulse characteristics of the ferrite rings were measured at 75° C. with a maximum value of the control current strength of 750 mA., an interference ratio of 0.61, a rise time of 30 nanoseconds, and a pulse duration of 300 nanoseconds. The measured results were as follows:

$uV_1$—26 mv. (with a temperature coefficient of 0.2 mv./° C. in the temperature range of from 0° C. to 90° C.).

$rV_1$—23 mv.
$wVz$—5 mv.
$t_s$—130 nanoseconds.
$t_p$—75 nanoseconds.

The symbols used have the following meanings:

$uV_1$—the maximum value of the output voltage of the undisturbed "one"-signal.
$rV_1$—the maximum value of the output voltage of the disturbed "one"-signal.
$wVz$—the maximum value of the output voltage of the disturbed "zero"-signal.
$t_s$—the switching time, i.e., the time which elapses between the instant at which the increasing control current strength reaches a value of 10% of its maximum value and the instant at which the output voltage of the disturbed "one"-signal has fallen off to a value of 10% of its maximum value ($rV_1$).
$t_p$—the peak time, i.e., the time which elapses between the instant at which the increasing control current strength reaches a value of 10% of its maximum value and the instant at which the output voltage of the disturbed "one"-signal reaches its maximum value ($rV_1$).

The coercive force ($H_c$) of the ferrite rings was 6 oersteds, the electric resistance, R, measured across the core, was 2 megohms.

EXAMPLE II

A finely divided mixture of 2.50 mol percent copper oxide, CuO, 27.50 mol percent manganese carbonate, $MnCO_3$, 7.26 mol percent lithium carbonate, $Li_2CO_3$, 3.22 mol percent nickel oxide, NiO, and 59.52 mol percent iron oxide, $Fe_2O_3$, was prefired by heating it in air at 700° C. for 3 hours in a chamber furnace. The resulting prefired powder was processed in the same manner as described in Example I to rings having an outer diameter of 435 microns and an inner diameter of 285 microns.

The rings were then conducted through the continuous conveyor-belt furnace described in Example I. The first zone of the furnace traversed by the rings contains air at a temperature of 1170° C.; the second zone contained nitrogen at a temperature of 950° C. The rings traversed the furnace in 3 minutes, so at a rate of 43 cm./minute. They were then cooled in air. The dimensions of the resulting ferrite rings were equal to those of the ferrite rings manufactured according to Example I.

Pulse characteristics were measured at 75° C. with a maximum value of the control current strength of 675 mA., an interference ratio of 0.61, a rise time of 30 nanoseconds, and a pulse duration of 300 nanoseconds. The measured results were as follows:

$uV_1$—30.5 mv. (with a temperature coefficient of 0.2 mv./° C. in the temperature range of from 0° C. to 90° C.).
$rV_1$—27.5 mv.
$wVz$—5.5 mv.
$t_s$—128 nanoseconds.
$t_p$—72 nanoseconds.

The coercive force ($H_c$) of the ferrite rings in question was 6 oersteds. The electric resistance, R, measured across the core, was 2 megohms.

EXAMPLE III

A finely divided mixture of 5 mol percent copper oxide, CuO, 55 mol percent manganese carbonate, $MnCO_3$, and 40 mol percent iron oxide, $Fe_2O_3$, was prefired by heating it in air at 700° C. for 3 hours in a chamber furnace (reaction product: prefired powder "A"). Furthermore a mixture of 14.51 mol percent lithium carbonate, $Li_2CO_3$, 6.45 mol percent nickel oxide, NiO, and 79.04 mol percent iron oxide, $Fe_2O_3$, was prefired by heating it in air at 600° C. for 3 hours in a fluid-bed furnace (reaction product: prefired powder "B").

The powders A and B were mixed in a molecular ratio of 1:1. The mixture was processed in the manner described in Example I to rings having an outer diameter of 435 microns and an inner diameter of 285 microns.

The rings were then conducted through the continuous conveyor-belt furnace described in Example I. The first zone of the furnace traversed by the rings contained air at a temperature of 1170° C.; the second zone contained nitrogen at a temperature of 900° C. The rings traversed the furnace in two minutes, so at a rate of 65 cm./minute. They were then cooled in air. The dimensions of the resulting ferrite rings were the same as those of the ferrite rings manufactured according to Examples I and II.

Pulse characteristics were measured at 25° C., with a maximum value of the control current strength of 770 mA., an interference ratio of 0.61, a rise time of 30 nanoseconds, and a pulse duration of 300 nanoseconds. The measured results were as follows:

$uV_1$—32 mv. (with a temperature coefficient of 0.2 mv./° C. in the temperature range of from 0° C. to 90° C.).
$rV_1$—30 mv.
$wVz$—5 mv.
$t_s$—126 nanoseconds.
$t_p$—2 nanoseconds.

The coercive force ($H_c$) of said ferrite rings was 6 oersteds, the electric resistance, R, measured across the core, was 2 megohms.

Of the same rings, pulse characteristics were measured at 75° C. wtih a maximum value of the control current strength of 675 mA., an interference ratio of 0.61, a rise time of 30 nanoseconds and a pulse duration of 300 nanoseconds. The measured results were as follows:

$uV_1$—31.5 mv. (with a temperature coefficient of 0.2 mv./° C. in the temperature range of from 0° C. to 90° C.).
$rV_1$—29 mv.
$wVz$—5.5 mv.
$t_s$—122 nanoseconds.
$t_p$—68 nanoseconds.

The coercive force and the electric resistance, measured across the core, were invariably 6 oersteds and 2 megohms respectively.

In the definition of the range of cation contents of the copper manganese lithium ferrites, from which the memory elements according to the invention are constructed, the premise was that said memory elements should have to satisfy the following quality requirements:

$uV_1 \geqslant 20$ mv.
$uV_1 \geqslant 4wVz$
$uV_1 - rV_1 \leqslant 4.5$ mv.
$t_s \leqslant 105$ nanoseconds.
$R \geqslant 1$ megohm.

Outside the defined limits of the range of cation contents the just-mentioned quality requirements could not be satisfied.

What is claimed is:

1. An annular magnet core consisting of a ferromagnetic ferrite and to be used as a magnetic memory element, said magnet core having an outer diameter smaller than 0.4 mm. and the inner diameter of which is at least half of the outside diameter, said magnet core having a $uV_1 \geq 20$ mV., $uV_1 \leq 4\ wVz$, $uV_1 - rV_1 \leq 4.5$ m.V., $t_s \leq 105$ nanoseconds, and $R \geq 1$ megohm said core having a composition corresponding to: 55.8–75.2 mol percent $Fe_2O_3$, 5.5–33 mol percent MnO, 5.8–13.1 mol percent $Li_2O$, 2.6–5.8 mol percent NiO, and 0.5–3.0 mol percent CuO.

2. A method of manufacturing magnet cores comprising the steps of forming a finely divided mixture of 55.8–75.2 mol percent $Fe_2O_3$, 5.5–33 mol percent MnO, 5.8–13.1 mol percent $Li_2O$, 2.6–5.8 mol percent NiO, and 0.5–3.0 mol percent CuO, prefiring said mixture, finely-dividing said prefired mixture, forming said finely-divided prefired mixture into annular bodies having an outer diameter less than 0.4 mm., and an inner diameter which is at least half the outer diameter, and thereafter sintering said bodies at a temperature between 1125° C. and 1225° C.

3. A method of manufacturing a magnet core as claimed in claim 2 wherein a starting mixture of finely divided oxides of iron, manganese and copper, is prefired, and a starting mixture of finely divided oxides of iron, lithium and nickel, is also prefired, after which the two prefired products are mixed and ground and annular bodies of the desirable dimensions are formed from the resulting mixed powder which has a composition within the range defined in claim 2 and are sintered at a temperature between 1125° C. and 1225° C.

4. A method of manufacturing a magnet core as claimed in claim 2 in which the annular bodies are sintered at a temperature between 1160° C. and 1180° C.

5. A method of manufacturing a magnet core as claimed in claim 3 in which the annular bodies are sintered at a temperature between 1160° C. and 1180° C.

References Cited

UNITED STATES PATENTS 3,583,918 6/1971 Turnbull et al. ----- 252—62.61

OTHER REFERENCES

IBM Technical Disclosure Bulletin, vol. 6, No. 8, January 1964, p. 108.

IBM Technical Disclosure Bulletin, vol. 4, No. 12, May 1962, p. 85.

ROBERT D. EDMONDS, Primary Examiner